United States Patent
Moos et al.

(10) Patent No.: US 7,236,498 B1
(45) Date of Patent: Jun. 26, 2007

(54) METHOD FOR SELECTING AN OUTSTATION USING A CONTROL CENTER IN A TRANSMISSION SYSTEM

(75) Inventors: Erich Moos, Zug (CH); Peter Hess, Hünenberg (CH)

(73) Assignee: Landis+GRY AG (CH)

( * ) Notice: Subject to any disclaimer, the term of this patent is extended or adjusted under 35 U.S.C. 154(b) by 0 days.

(21) Appl. No.: 09/673,959

(22) PCT Filed: Mar. 5, 1999

(86) PCT No.: PCT/EP99/01433

§ 371 (c)(1),
(2), (4) Date: Dec. 28, 2000

(87) PCT Pub. No.: WO99/56138

PCT Pub. Date: Nov. 4, 1999

(30) Foreign Application Priority Data

Apr. 23, 1998 (EP) .................................. 98107370

(51) Int. Cl.
*H04L 12/42* (2006.01)

(52) U.S. Cl. ................ 370/450; 370/282; 370/462

(58) Field of Classification Search ............... None
See application file for complete search history.

(56) References Cited

U.S. PATENT DOCUMENTS 5,390,360 A    2/1995   Scop et al.
6,078,870 A *  6/2000   Windsheimer ............ 702/61
6,677,862 B1 * 1/2004   Houlihane et al. ...... 340/870.03
2002/0118676 A1 * 8/2002 Tonnby et al. ............. 370/352

FOREIGN PATENT DOCUMENTS

EP   0 583 073 A1   2/1994
JP   10051473       2/1998

OTHER PUBLICATIONS

"Application of Data Acquisition and Power Control to Regional and Central Control Systems", by D.J. Modell, Advances in Instrumentation and Control, vol. 48, Part 02, 1993.

* cited by examiner

*Primary Examiner*—Duc Ho
(74) *Attorney, Agent, or Firm*—Maginot, Moore & Beck

(57) ABSTRACT

The method serves for calling a substation ($US_m$) by a central station (Z) in a transmission system for the purposes of information transmission by way of a communication channel (m) called from a plurality of communication channels. The plurality of communication channels is subdivided into communication groups (GRI, GRII, GRIII) of the same property or the same parameter values. Within a selected communication group (GRII) a communication channel (m) is called, which is still communication-free. If all (n) communication channels of the communication group (GRII) are already busy, the central station (Z) goes into a waiting condition until at least one of the communication channels of the communication group (GRII) becomes communication-free. The method permits optimum, parallel and synchronous utilisation of all available communication means for a group of the substations so that the central station (Z) by way of communication channels of that group acquires simultaneously and in optimum fashion data, in particular measurement data of electricity meters, of all associated substations.

14 Claims, 1 Drawing Sheet

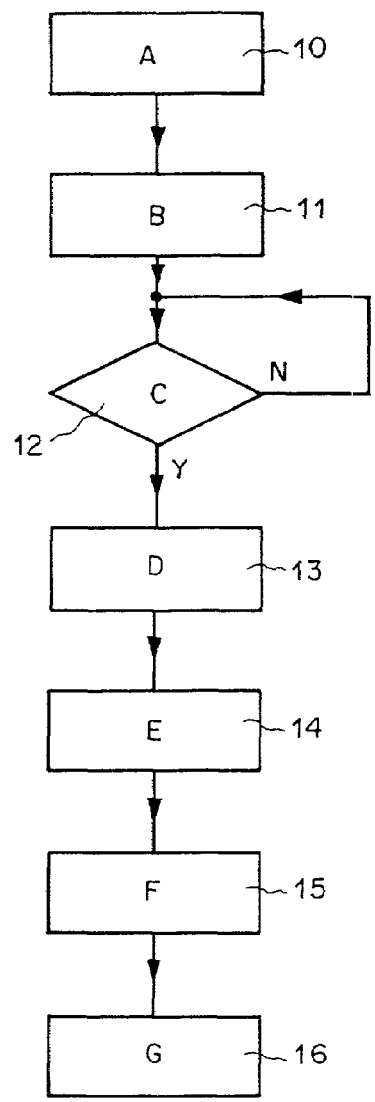
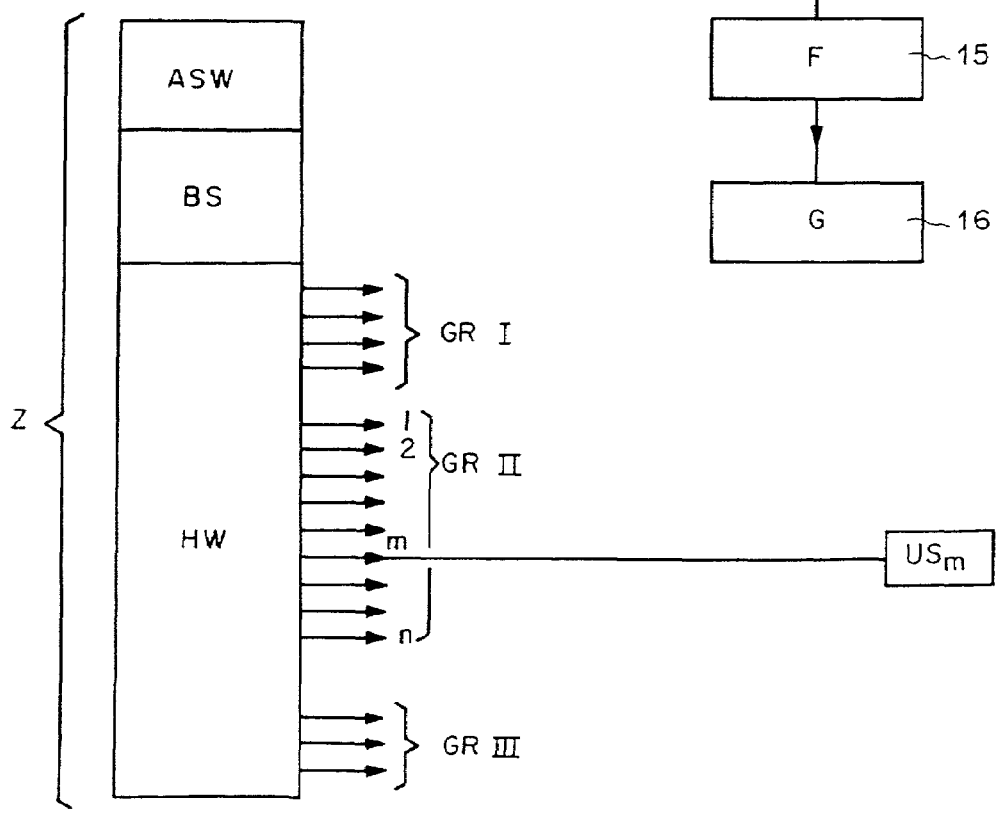

METHOD FOR SELECTING AN OUTSTATION USING A CONTROL CENTER IN A TRANSMISSION SYSTEM

BACKGROUND AND SUMMARY

The invention relates to a method of calling a substation by a central station in a transmission system.

The method is preferably used in a transmission system which serves for the remote reading of electricity meters.

U.S. Pat. No. 5,390,360 sets forth a method of acquiring access rights to a communication channel in a radio frequency communication system, wherein a first unit interrogates a plurality of second units. The first unit receives a command to start the interrogation cycle by way of a communication channel. The first unit then selects a time delay from a group of time delays and transmits in series, when the channel is free, at the end of the selected time delay, an interrogation request at least to all second units of a subgroup from the plurality of second units.

The English Abstract of JP 10051473 A discloses a communication system In which a master station communicates with a plurality of slave stations by way of a two-way communication path.

EP 581 073 A1 is concerned with a cordless telephone system in which one channel out of a plurality of channels is selected and wherein that selected channel is used for the transmission and reception of speech data in a timesharing mode.

The object of the invention is to provide a method of the kind set forth hereinbefore, which permits optimum, parallel and synchronous utilisation of all available communication means for a group of substations so that a central station, by way of communication channels of that group, detects simultaneously and in an optimum fashion data and in particular measurement data of electricity meters, of all associated substations.

In accordance with the invention the specified object is attained by the features recited in the characterising portion of claim 1. Advantageous embodiments of the invention are set forth in the appendant claims.

BRIEF DESCRIPTION OF THE DRAWINGS

An embodiment of the invention is described in greater detail hereinafter and illustrated in the drawing in which:

FIG. 1 is a diagrammatic view of a transmission system, and

FIG. 2 shows a flow chart for data acquisition.

DESCRIPTION

A transmission system diagrammatically shown in FIG. 1 comprises a central station Z which is connected to substations by way of a plurality of communication channels. The transmission system serves preferably for remote reading of electricity meters which belong to the substations and are connected thereto. The central station Z must be capable of simultaneously actuating a plurality of communication channels in order to acquire the data of the substations in parallel relationship. The central station Z includes hardware HW, an operating system BS and application software ASW (user software). The hardware HW is connected to the substations by way of the plurality of communication channels. As the individual substations have different communication parameters such as transmission mode, control sign and so forth, in accordance with the invention the individual communication channels are combined to form communication groups. The plurality of the communication channels is thus subdivided into communication groups involving the same property or identical parameter values. In that case each communication channel of a communication group is so selected that it has the same communication parameters as the other communication channels of the communication group. As already mentioned such a parameter is the transmission mode, for example a half-duplex or full duplex mode. The communication channels of the same communication group thus employ the same transmission mode. It is assumed in FIG. 1 that there are three communications groups GRI, GRII and GRIII, wherein for example the communication group GRI has four communication channels, the communication group GRII has n communication channels and the communication group GRIII has three communication channels. When defining a substation, a communication group which has the communication parameters which are applicable to that substation is associated with that substation. By way of the communication channels of that communication group, the central station Z can acquire the data, for example measurement data of the corresponding electricity meters, of the substations in question. That permits optimum, parallel and synchronous utilisation of all available communication means for a communication group of substations. For reasons of simplicity of the drawing, FIG. 1 shows only a single substation $US_m$ which is connected to the m-th communication channel of the communication group GRII.

The method according to the invention of calling a substation, for example $US_m$, by the central station Z of the transmission system for the purposes of information transmission by way of a communication channel, for example m, which was called from the plurality of the communication channels, provides that, within a selected communication group, for example GRII, which has the desired properties or parameter values, a communication channel m is called, which is still communication-free. If all n communication channels of the communication group GRII in question are already busy, the central station Z goes into a waiting condition until at least one of the communication channels of the communication group GRII in question is communication-free. For that purpose, each communication group GRI, GRII and GRIII of the communication channels preferably has its own code word, for example as an address, associated therewith. When a communication channel is busy with a communication, an item of busy information is stored in the central station Z, from which the central station Z recognises that the communication channel in question is already busy. Storage of the item of busy information preferably involves setting a flag or storing a code word in a memory of the central station Z. In that case the item of busy information is stored in the operating system BS in the central station Z or in the application software ASW in the central station Z.

Acquisition of the data of the substations by the central station Z takes place in accordance with the flow chart shown in FIG. 2. It includes 6 functional blocks 10 to 11 and 13 to 16 and a decision block 12 which are connected in series in the sequence of their numbering. The functions A, B, C, D, E, F or G are associated in the specified sequence with the blocks 10 to 16, wherein the functions involve the following significances:

A start of a data acquisition of a given substation,

B reading of the designation of the associated communication group,

C questioning whether a communication channel of that communication group is free or not free,
D occupying a free communication channel,
E acquiring the data,
F releasing the communication channel used for communication purposes, and
G end of data acquisition.

The decision block 12 has a yes-output identified by Y ('yes') and a no-output identified by N, ('no'), the latter being connected to the input of the decision block 12 while the former is taken to the input of the next function block 13 of the series arrangement.

After a start of the data acquisition procedure in accordance with function block 10, then in accordance with function block 11 the communication group corresponding to the substations whose data are to be acquired is selected and then in accordance with decision block 12 it is determined whether one of the communication channels of the communication group in question is still free or is not free. In decision block 12 case the program goes back to the input of the decision block 12 again and executes the former until one of those communication channels is free. When the latter is the case, the program goes to the function block 13 and occupies the free communication channel with the data acquisition procedure which takes place as indicated by function block 14. After the conclusion thereof the communication channel is freed again as indicated by the function block 15, whereby the transmission is then terminated as indicated by the function block 16.

The invention claimed is:

1. A method of calling a substation by a central station in a transmission system for the purposes of information transmission for remote reading of electricity meters by way of a communication channel selected from a plurality of communication channels, wherein the plurality of communication channels are divided into communication groups, wherein the communication channels within a communication group have the same communication properties, the method comprising:
   a) identifying a first communication group associated with a select substation to be called;
   b) determining whether any communication channel of the first communication group is free;
   c) acquire meter reading data over a free channel of the first communication group if it is determined that any communication channel of the first communication group is free; and
   d) waiting and repeating step b if it is determined that no communication channel of the first communication group is free.

2. The method of claim 1 wherein each of the communication groups is associated with a specific code word, the specific code word representative of a memory address.

3. The method of claim 1 wherein step c) further comprises storing an item of busy information for the free channel.

4. The method of claim 3 wherein storing the item of busy information for the free channel comprises setting a flag.

5. The method of claim 3 wherein storing the item of busy information comprises storing a code word which is stored in a memory of the central station.

6. The method of claim 3 wherein storing the item of busy information comprises storing the item of busy information in an operating system located in the central station.

7. The method of claim 3 wherein storing the item of busy information comprises storing the item of busy information in an application software located in the central station.

8. An arrangement for information transmission for remote reading of electricity meters over a communication system, the arrangement comprising:
   a plurality of communication channels divided into communication groups, wherein the communication channels within a communication group have the same communication properties,
   a substation associated with a first communication group;
   a central station coupled to the plurality of communication channels, the central station operable to
      a) determine whether any communication channel of the first communication group is free,
      b) acquire meter reading data over a free channel of the first communication group if it is determined that any communication channel of the first communication group is free, and
      c) waiting and repeating the step c if it is determined that no communication channel of the first communication group is free.

9. The arrangement of claim 8 wherein the central station is further operable to associate each of the communication groups with a specific code word, the specific code word representative of a memory address.

10. The arrangement of claim 8 wherein the central station is further operable to store an item of busy information for the free channel.

11. The arrangement of claim 10 wherein the central station is further operable to store the item of busy information for the free channel by setting a flag.

12. The arrangement of claim 10 wherein the central station is further operable to store the item of busy information by storing a code word which is stored in a memory of the central station.

13. The arrangement of claim 10 wherein the central station is further operable to store the item of busy information by storing the item of busy information in an operating system located in the central station.

14. The arrangement of claim 10 wherein the central station is further operable to store the item of busy information in an application software located in the central station.

* * * * *

UNITED STATES PATENT AND TRADEMARK OFFICE
CERTIFICATE OF CORRECTION

| | |
|---|---|
| PATENT NO. | : 7,236,498 B1 |
| APPLICATION NO. | : 09/673959 |
| DATED | : June 26, 2007 |
| INVENTOR(S) | : Erich Moos and Peter Hess |

Page 1 of 1

It is certified that error appears in the above-identified patent and that said Letters Patent is hereby corrected as shown below:

On the Title Page at INID Code (73): replace "Landis+GRY AG (CH)" with --Landis+GYR AG (CH)--

Signed and Sealed this

Twenty-sixth Day of August, 2008

JON W. DUDAS
*Director of the United States Patent and Trademark Office*